United States Patent [19]

Gunther, Jr.

[11] Patent Number: 5,039,077
[45] Date of Patent: Aug. 13, 1991

[54] MULTIBIN FEEDER

[75] Inventor: William H. Gunther, Jr., Gunther International Ltd., P.O. Box 586, Mystic, Conn. 06355

[73] Assignee: William H. Gunther, Jr., West Mystic, Conn.

[21] Appl. No.: 430,379

[22] Filed: Nov. 2, 1989

[51] Int. Cl.⁵ .......................................... B65H 39/00
[52] U.S. Cl. ...................................... 270/52; 270/58; 271/265
[58] Field of Search ..................... 270/52, 53, 54, 56, 270/58; 271/9, 158, 159, 265

[56] References Cited

U.S. PATENT DOCUMENTS 4,799,661  1/1989  Nail ........................................ 270/54

FOREIGN PATENT DOCUMENTS

| 87487 | 9/1983 | European Pat. Off. | ............. 270/58 |
| 268212 | 5/1988 | European Pat. Off. | ............. 270/58 |
| 156966 | 9/1982 | Japan | ................................ 270/56 |
| 22257 | 2/1983 | Japan | ................................ 270/58 |
| 128160 | 7/1984 | Japan | ................................ 270/52 |

Primary Examiner—Edward K. Look
Assistant Examiner—Therese M. Newholm
Attorney, Agent, or Firm—Stoll, Previto & Hoffman

[57] ABSTRACT

A multibin feeder having a plurality of bins. A stack of sheets in the bins. Each sheet having data thereon. A mechanism for storing predetermined data. Each sheet is fed from the bins. Reading means are provided to read the data on each sheet before the sheet is fed. The data read on said sheet is compared to the predetermined data. Mechanism is provided to prevent the sheets from moving to the next station if the data read by the reading mechanism does not match the predetermined data.

14 Claims, 1 Drawing Sheet

MULTIBIN FEEDER

DESCRIPTION

The present invention relates to a multibin feeder and more particularly to a multibin feeder for non-impact printers.

The need of a multibin feeder for non-impact printers is a top priority of the users of these types of printers. At the present time the majority of the sheet fed non-impact computer printers print with the sheets fed upside down into the printer. Due to this method of feeding paper it is not possible for the operator to know whether the paper is oriented properly. An example of this would be a pre-printed letterhead being put into the input feed hopper with the paper 180 degrees to its proper orientation. This would cause the printer to print the letter with the name and address on the bottom of the sheet and the pre-printed letterhead would be upside-down at the other end of the sheet. This is a very common occurrence and there is a need for ascertaining that the paper is oriented properly before it is fed into the printer.

Another problem with the existing sheet fed printers, is that they usually have only two or three input hoppers, which is not sufficient for the needs of the large user of multiple types of formats used in a total document, such as an insurance policy.

The present invention avoids these problems and provides a multiple bin feeder which takes these major considerations into account and also provides for mistakes in the feeder mechanism and also errors occurring in the printer itself which causes a reprint sequence of destroyed sheets.

Preferably, the mechanism of the present invention comprises a plurality of multi-feed bins. The bins are capable of holding up to 1,000 sheets of paper in each. The sheets in the bins are fed from the bottom of the stack of sheets in each bin. Each bin has a reading device that checks (reads) each sheet of paper before it is fed to verify that the paper is oriented properly and that it is in the proper sheet. This reading is done by either an OMR (Optical Mark Recognition—one or more read heads which verify the presence or absence of predetermined marks in a particular area) device which would look for a specific mark in a predetermined area, or a BCR (Bar Code Recognition—a reader having intelligence to scan a group of bars and decode them into a numeric or alpha/numeric equivalent, which is then compared with a predetermined number in the feeders control logic) reader which would read a pre-printed number identifying the form to a predetermined number in the memory of the feeders logic controller, or an OCR (Optical Character recognition—a reader which actually looks at an alpha or numeric character and decodes it to its equivalent in the logic of the control device) device which would do a similar check as the BCR device but would do it by reading actual characters in lieu of bar codes.

Each bin also has a sensor to verify that a sheet was fed on command and a sensor that indicates if more than one sheet was fed at the same time.

There is an electronic control mechanism (similar to a PC computer) which receives signals from the printer or some other device as to what sequence the sheets of paper are to be presented to the printer. This device also has the ability to monitor all of the readers, the feeders, the sensors, and also if the printer has operating problems and needs another group of sheets to be reprinted.

In operation the multibin feeder is programmed as to what types of pre-printed sheets of paper are to be placed in each bin. Since the sheets are placed in the bin upside down, each sheet is read after the preceding sheet was fed from the same bin, to verify that the next sheet ready to be fed is the proper sheet and that it is oriented properly. As the printer or other device gives a signal to the controller in the multibin feeder to feed a particular sequence of sheets, the feeder sends a signal in the proper sequence to each bin to feed one sheet of paper.

As each bin gets its feed signal, the feeding device feeds one sheet of paper. In the event that a sheet is not fed on the first try, the feeder makes several more attempts to feed the sheet. In the event that it cannot feed a sheet from that bin, the controller gives a signal to the operator of a possible problem, and indicates which bin has the problem.

If a particular feed bin feeds more than one sheet of paper in one cycle, the entire group of sheets is diverted to a discharge bin, and the controller gives the command to automatically re-feed the proper sequence of sheets.

In one embodiment, sheets are moved from each bin to a conveyor which feeds the sheets one by one to a printer which then personalizes the sheets by adding names and any other data which is pertinent to the document which is being formed.

In another embodiment, the mechanism has a collating station which assembles all of the sheets called for in one collation. In the event that a sheet is not fed from one of the bins on command and the other sheets were fed, then the entire group that was fed would be bypassed at the collating hopper and the controller would give the command to re-feed the same sequence of sheets. This method is also used in the event that more than one sheet is fed from one particular bin in any one cycle.

The mechanism has a transport device to transport a correct group of collated documents to a printer. After a cycle sequence is recognized as being correct, the entire group is transported to the printer infeed device. The entire memory of the sheets fed into the printer infeed device is held by the multibin controllers memory until the printer gives a signal that each particular sheet is printed and delivered to its output device. In the event that a particular sheet or sheets is destroyed during the printing process, the controller ejects all of the sheets which have been fed. The controller then reconstructs the exact collation of sheets that were destroyed.

By using such a device a user of high speed non-impact sheet fed printers is always sure that the paper is oriented properly, the sheets are always in the proper sequence, and that a recovery is guaranteed to represent the proper sheets in the order called for.

Figure 1:
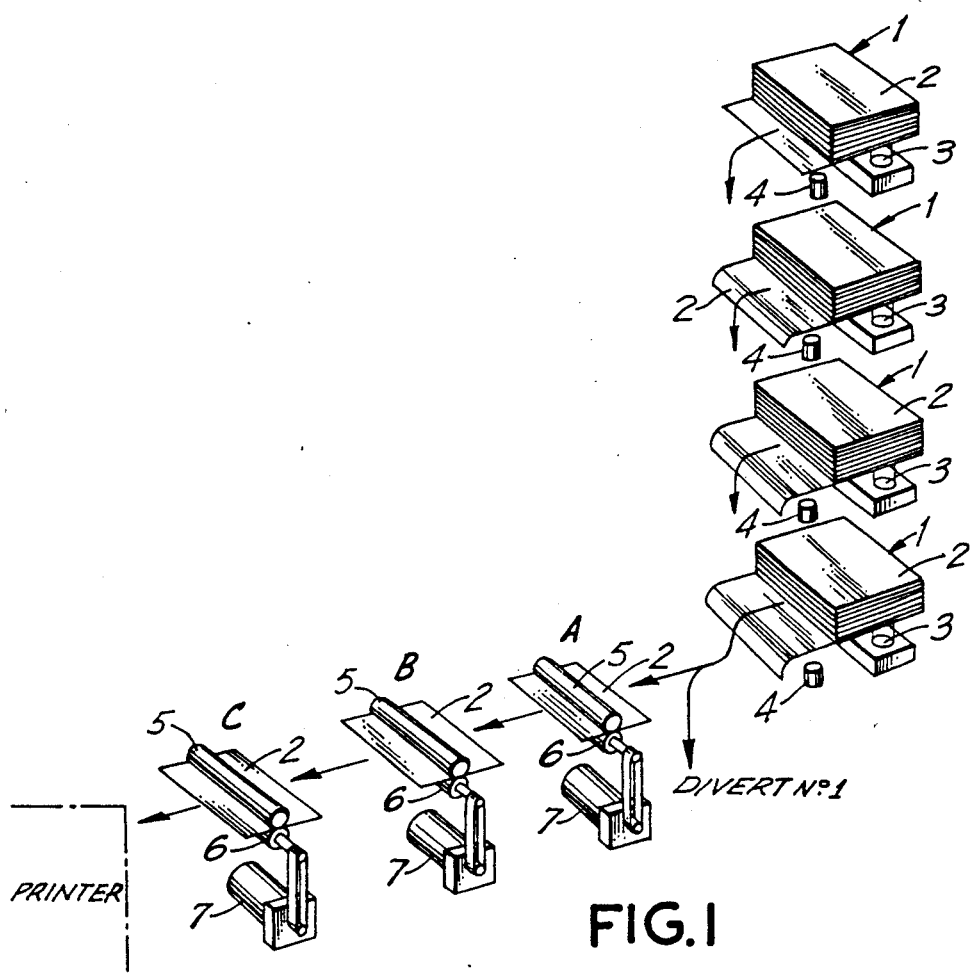
FIG. 1 is a schematic perspective view showing the preferred embodiment of my invention.

Referring to the drawings and particularly to FIG. 1, a stack 1 of pre-printed sheets 2 are placed in separate bins (not shown). The stacks 1 (which are preferably in superimposed relationship to each other) have data thereon and are placed in the stacks 1 upside-down. In the embodiment shown in FIG. 1, there are four stacks 1 shown, each representing a different page. However, it will be understood that the number of stacks 1 may change if desired.

Each bin has a reading mechanism 3 which reads the bottom-most sheet 2 of each stack 1 to be certain that the bottom-most sheet 1 is the one that is to be fed from the stacks. This reading mechanism 3 may also incorporate reading means to determine that the sheets are properly oriented. The reading is done before the sheets 2 are fed from the stack 1. Upon command from a central computer, the sheets 2 are fed from each stack. As indicated above, the data on the sheets 2 is read before they are fed so that if there is any sheet 2 which does not follow in the group, the operation may be stopped immediately and the error corrected. In addition, there is a sensing mechanism 4 at each bin which senses that a sheet 2 is fed from each bin. If a particular sheet is not fed from a bin, all the sheets that have been fed from the bin are diverted and destroyed and the computer commands the mechanism to feed another set of sheets 2. This reading mechanism 4 may also include means to sense whether more than a single sheet is fed from a stack 1.

The sheets 2 are then passed by a conveyor, represented by stations A, B and C each of which are a pair of rollers 5-6 operated by motors 7, shown as comprising and are then fed to a printer machine which completes the operation in the formation of a document, e.g. personalizing the document. If any of the sheets are not the proper sheets to be used in the document, the printer will divert and destroy them and a new set of sheets is ordered by the computer.

Figure 2:
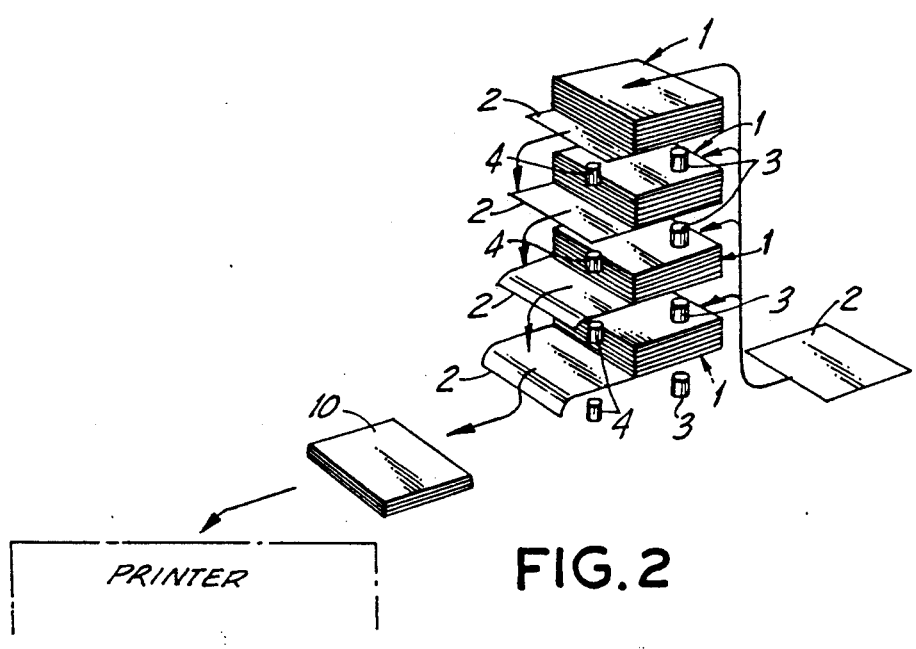
FIG. 2 is a schematic perspective view showing another embodiment of the invention.

In another embodiment as shown in FIG. 2, the sheets 2 are again fed from the various stacks 1 from the bottom thereof. Again, sensing means 3 and 4 are provided in each bin to scan the lowermost sheet 2 of each stack 1 to determine whether the proper sheet is there, to determine the proper orientation and to determine whether no sheet or more than one sheet is fed. If the orientation is not correct, the sheet is not fed, the wrong sheet is fed or more than one sheet is fed, the sheets which had been fed are diverted and destroyed and a new set of sheets is ordered by the computer.

When the proper sheets have been fed from the bin, they are collated in a stack 10 and from there are fed to a printer which again personalizes the document or performs any other printing function desired.

It will be seen that the present invention provides a multibin feeder which will ascertain whether paper is oriented properly before it is fed into the printer; whether the paper being fed is the proper one and whether more than one sheet or no sheet is fed from each bin.

As many and varied modifications of the subject matter of this invention will become apparent to those skilled in the art from the detailed description given hereinabove, it will be understood that the present invention is limited only as provided in the claims appended hereto.

The embodiments of the invention in which an exclusive property or privilege is claimed are defined as follows:

1. A multibin feeder comprising a plurality of bins, at least one sheet in at least one of said bins, said sheet having data thereon, means for storing predetermined data, means for feeding a sheet from said bin, means for reading said data on said sheet before the sheet is fed from said bin and while the sheet is still in said bin, means for comparing the data on said sheet with said predetermined data, means for moving the fed sheet from the bin to a predetermined position, means for preventing the sheet from moving to said predetermined position if the data read by the reading means does not match the predetermined data.

2. A multibin feeder as set forth in claim 1 wherein means are provided to determine whether the sheet to be fed is the proper sheet.

3. A multibin feeder as set forth in claim 2 wherein means are provided to determine whether said sheet is oriented properly.

4. A multibin feeder as set forth in claim 3 wherein means are provided to determine whether a sheet has been fed from the bin.

5. A multibin feeder as set forth in claim 4 wherein means are provided to determine whether more than one sheet has been fed.

6. A multibin feeder as set forth in claim 5 wherein means are provided to determine whether the sheet being fed in the proper sequence.

7. A multibin feeder as set forth in claim 6 wherein a plurality of bins is provided and wherein there is a stack of sheets in each of said bins.

8. A multibin feeder as set forth in claim 7 wherein means are provided to collect mismatched sheets and discard them.

9. A multibin feeder as set forth in claim 8 wherein after discarding a new set of sheets is fed.

10. A multibin feeder as set forth in claim 8 wherein means are provided in said storage means to command the feeder to feed the sheet from the bins in a predetermined sequence.

11. A multibin feeder as set forth in claim 10 wherein means are provided to command the feeder to make additional attempts to feed a sheet if a sheet is not fed at the first attempt.

12. A multibin feeder as set forth in claim 11 wherein said sheets are collated before being moved to said predetermined position.

13. A multibin feeder as set forth in claim 12 wherein means are provided to discard the collated sheets if there is a mismatch and the new collation of sheets is assembled.

14. A multibin feeder as set forth in claim 7 wherein said plurality of bins are provided in vertical orientation to each other and wherein there is a stack of vertically oriented sheets in each of said bins.

* * * * *